No. 715,409. Patented Dec. 9, 1902.
R. McBRIDE.
BALING PRESS.
(Application filed Feb. 14, 1902.)
(No Model.) 2 Sheets—Sheet 2.
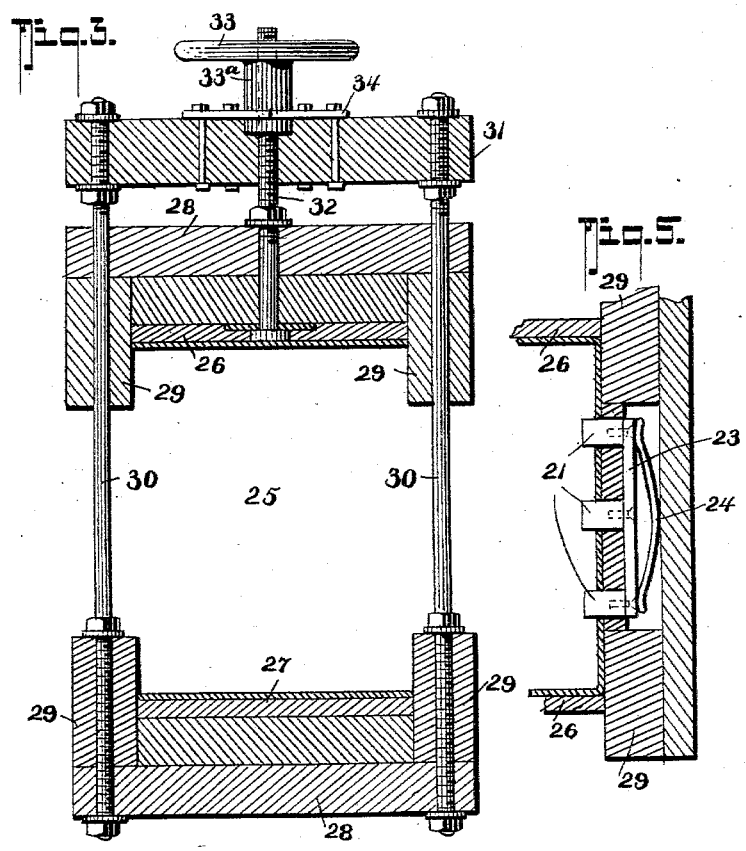
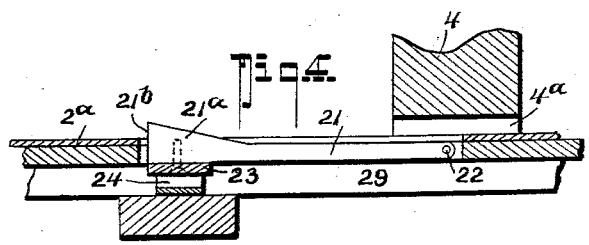
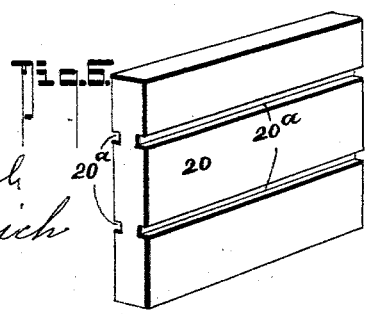
WITNESSES:
A. E. Dieterich
Louis Dieterich
INVENTOR
Robert McBride
BY
Fred G. Dieterich
ATTORNEY

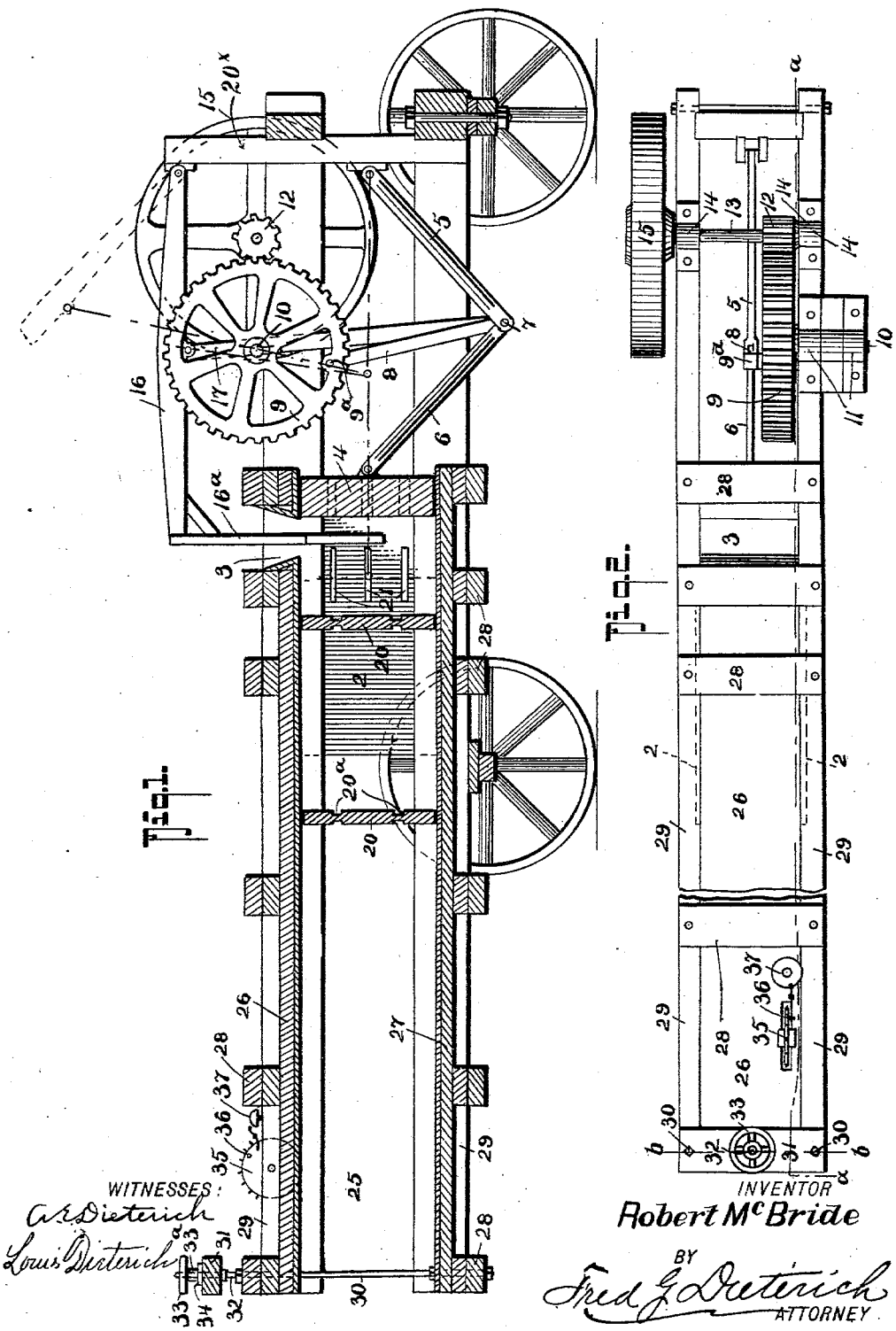

UNITED STATES PATENT OFFICE.

ROBERT McBRIDE, OF EBURNE, CANADA.

BALING-PRESS.

SPECIFICATION forming part of Letters Patent No. 715,409, dated December 9, 1902.

Application filed February 14, 1902. Serial No. 94,032. (No model.)

*To all whom it may concern:*

Be it known that I, ROBERT MCBRIDE, a citizen of the Dominion of Canada, residing at Eburne, in the Province of British Columbia, Canada, have invented a new and useful Baling-Press, of which the following is a specification.

My invention relates to an improvement in power-presses for baling hay or similar material and belongs to that class known as a "perpetual" press, inasmuch as long as it is supplied with material the work of pressing and baling is continuous, no rest requiring to be made for wiring, &c.

My object has been to provide a machine which is simple in construction, economical in the use of power, and that will exert its greatest effort when the greatest pressure is required—that is, that when the loose hay is fed into the machine the compressing-plunger comes forward at a comparatively rapid speed, but toward the finish of the stroke the speed is very much slower, but the pressing effort proportionately more powerful. I attain this important result by the use of a toggle mechanism operated by suitably-designed gear, and it is to the application of this principle and several minor details of the construction and mechanism that the success of my machine is largely due.

The press and the manner of its operation are fully illustrated in the drawings herewith, in which—

Figure 1 is a vertical longitudinal section on the line $a\,a$ in Fig. 2; Fig. 2, a plan with tramper removed; Fig. 3, a cross-section on the line $b\,b$ in Fig. 2; Fig. 4, a detail horizontal section showing the retainers, and Fig. 5 a vertical section of the same. Fig. 6 is a perspective of one of the division-boards.

The bale-press proper consists of a strong open-ended rectangular chamber 2, having at its upper side a feeding-opening 3, through which the loose hay is introduced and having at one end a plunger or presser head 4, horizontally slidable endwise within the rectangular chamber the length of the feed-space 3 and slightly beyond. This plunger 4 is operated by a toggle mechanism composed of the link members 5 and 6, one end of 5 being pivotally anchored to the back member $20^x$ of the machine-frame and the free end of 6 similarly coupled to the center of the plunger 4. The joint-pin 7 of this toggle is coupled by the connecting-rod 8 to a crank-pin $9^a$, projecting from a gear-wheel 9, attached to a cross-shaft 10, rotatable on bearings 11, suitably supported to the framework of the machine. The wheel 9 is driven by a pinion 12 on the pulley-shaft 13, rotatable in bearings 14, by the pulley or band wheel 15 from any source of power exterior to the machine. Fulcrumed to an upward extension of the frame-timbers $20^x$ is the tramper-lever 16, operated by a connecting-link 17 from the toggle-joint pin 7. This tramper-lever has a downward right-angle extension $16^a$, suitably braced at the junction and adapted at its lower end to press the loose hay into the rectangular press-chamber and the path of the plunger 4. The operation of this mechanism is fully illustrated by the dot-and-dash lines in Fig. 1. The power from the belt over the pulley 15 is multiplied by the pinion 12, gearing into the wheel 9, and by means of the connecting-rod 8 and the joint-pin 7 the toggle is drawn up to the straight line between its end connections, forcing the plunger 4 into the rectangular chamber, the further movement of the wheel and its crank-pin forcing the toggle system down to the position as shown, by which the plunger is withdrawn. Simultaneous with the withdrawal of the plunger 4 the tramper 16 is drawn down and a further supply of material is brought into the compressor-chamber 2 ready for the next advance of the plunger 4, the tramper being lifted up clear of the opening 3 as the toggle straightens and the compressor-plunger advances to its work. Between each bale a division-board $20^y$ is inserted through the feed-opening. This is simply a plain rectangular board, loosely fitting the cross-section of the compressor-chamber and provided with horizontal grooves $20^a$ across its face to enable the baling-wire to be passed from side to side during the progress of the bale along the slide.

Within each vertical side wall $2^a$ of the compressing-chamber 2 (see Fig. 4) are a series of retainers 21 to prevent the compressed portion of the bale after each stroke from following the plunger during its withdrawal. Each consists simply of a stout piece 21, hinged within the thickness of the side wall 2ª, and their free ends oppose an inclined surface 21ª to the forward movement of the bale or its division-board, but a square end 21ᵇ to their return. Each retainer of the group on each side is hinged on a pin 22, and they are connected together outside the side wall by the bar 23, against which the ends of the flat spring 24 press. The sides of the compressor-plunger 4 are grooved, as at 4ª, to allow it to pass the retainers without pressing them in.

From the compressing-chamber 2 extends the bale-guideway 25, during the passage along which opportunity is afforded for wiring the bales through the grooves referred to in the division-boards. This guideway is composed of a top and bottom boarding 26 and 27, secured by the cross members 28 to the corner longitudinals 29, which are extensions of the frame members of the machine to which the operative mechanism is attached by the cross-frames. The top and bottom framing of this guideway have no vertical members between them after leaving the compressing-chamber, so that they may be drawn together or forced apart by the mechanism provided for the purpose at the extreme end and which is clearly illustrated in Fig. 3. Through the ends of the longitudinals 29 and their cross member 28 are the vertical stay-rods 30, which are secured to the lower timbers by the double nuts, as shown, pass through the upper ones without any fastening, but are secured to an independent cross-piece 31 above the upper cross-frame 28. Secured to the top 26 of the guideway is a screw 32, which passes through the cross-piece 31 and has at its upper end a hand-wheel 33, the boss of which is threaded internally as a nut for the screw 32 and externally is provided with an annular groove 33ª, adapted to receive a washer 34, which is made in two halves and securely fastened to the upper side of the cross-piece 31. On turning the hand-wheel 33 the upper and lower members of the bale-guideway are drawn together or forced apart and the frictional resistance to the passage of the bales lessened or increased, and as this frictional resistance is what the compressor-plunger acts against in packing the bale a means is thus provided for varying the degree of pressure with which the bales are packed, as may be required by the quality of the hay or its degree of dryness.

As a guide to the attendant in regulating the length of the bales by the timely insertion of the division-boards in the opening 3 I provide toward the end of the bale-guideway a wheel 35, having a toothed or serrated periphery, which projects through the upper boarding of the guideway and is adapted to be rotated by the passing bale. The circumference of this wheel is equal to the length of bale required, and a projecting pin 36 engages the striker of an adjacent bell 37 and rings it on the completion of a revolution.

It will be seen from the foregoing description that the construction of my press is very simple and that its operating mechanism is well fitted for the purpose required, as no power is wasted in the movement of the plunger against the resistance of the loose hay; but as it becomes packed toward the end of the stroke the effort on the plunger is considerable and much more than could otherwise be attained by power-multiplying gears. The facility also with which the resistance against which the plunger acts can be varied to the changing requirements of the press is a point of considerable importance and much enhances the value of my press. The whole machine can be mounted for convenience of mobility on ordinary truck-wheels, as shown in Fig. 1.

Having now particularly described my press and the manner of its operation, what I claim as new, and desire to be protected in by Letters Patent, is—

In a baling-press of the character described; the combination with the baling-chamber and the main frame, including the upright $20^x$ at the rear of the baling-chamber, said baling-chamber having a feed-throat; of a follower operating in said chamber, a vertically-reciprocable tramper movable in the feed-throat of the baling-chamber, the drive-shaft 13 journaled transversely of the machine at a point between the baling-chamber and the upright $20^x$, the shaft 10 geared with the drive-shaft 13, a crank-wheel mounted on said shaft, a vertically-swingable lever 16, pivoted at one end to the upright $20^x$ and fixedly connected at the other end to the tramper-head, a pair of toggle-levers 5 and 6, a pivot 7 at the joined end of the said levers, one of the levers being pivotally connected to the follower, the other being pivotally connected to the upright $20^x$ in the longitudinal plane of the pivotal follower connection of the other lever, a pair of link-arms 8 and 17, both connected with the pivot 7, the arm 8 being pivotally connected to the crank-wheel, and the other arm 17, pivotally joined to the lever 16, all being arranged substantially as shown and described.

In testimony whereof I have hereunto signed my name in the presence of two subscribing witnesses.

ROBERT McBRIDE.

Witnesses:
ROWLAND BRITTAIN,
ELLICE WEBBER.